Dec. 28, 1965   MASUMI ATSUKAWA ETAL   3,226,192
PROCESS OF TREATING WASTE GAS CONTAINING SULFUR OXIDE
Filed Feb. 25, 1963
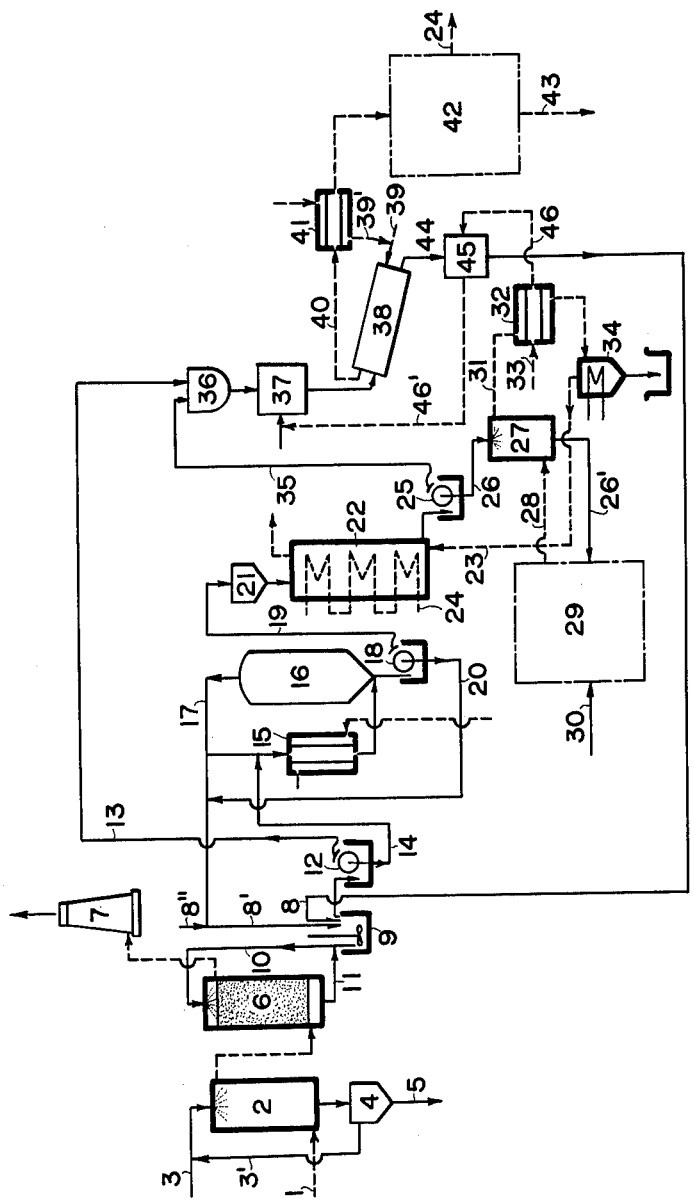

United States Patent Office 3,226,192
Patented Dec. 28, 1965

3,226,192
PROCESS OF TREATING WASTE GAS CONTAINING SULFUR OXIDE
Masumi Atsukawa and Kazuhiro Matsumoto, Hiroshima, and Hiroyuki Murokawa, Asa-gun, Hiroshima Prefecture, Japan, assignors to Mitsubishi Shipbuilding & Engineering Company, Limited, Tokyo, Japan
Filed Feb. 25, 1963, Ser. No. 260,441
Claims priority, application Japan, Feb. 28, 1962, 37/7,281
10 Claims. (Cl. 23—167)

This invention relates to a process of treating a waste gas containing sulfur oxide with an absorbent, manganese oxide to render the waste gas harmless and more particularly to a process of producing commercially valuable sulfuric acid and chlorine from such a waste gas with manganese oxide regenerated.

As well known, waste gases discharged from metal refining plants, chemical plants, power stations, etc. contain sulfur oxide such as sulfur dioxide or trioxide which is typical of harmful materials causing injury to the public. Nevertheless such sulfur oxide is one of useful materials as a raw material in the field of chemical industry. Various attempts have been heretofore proposed to economically remove sulfur oxide from the waste gases and at present several of them actually practical in the case of the gases are relatively small in amounts and include sulfur oxide in relatively high concentrations.

On the other hand, in power stations from which the waste gases referred to are discharged in large amounts and which cause great injury to the public in view of their conditions of location, high capacity boilers equipped therein are progressively switching from the coal burning type to the oil burning type in recent years. The use of any heavy oil from the Middle and Near East districts including a high content of sulfur results in a far higher concentration of sulfur oxide in the combustion gas as compared with the case when coal is burned. In addition, capacity for each boiler is high. It will be, therefore, appreciated that, if the combustion gas would be exhausted to the surrounding atmosphere without the same subjected to any suitable treatment then the public injury will inevitably occur. Also it is thought that the application of any of the previously proposed treatment processes to factories from which waste gases including high contents of sulfur oxide are exhausted has disavantages and is difficult unless such processes be modified or improved.

More specifically, as any of the power stations discharges extremely high amount of a waste gas such as above described the total amount of sulfur oxide contained in the waste gas will become enormous in spite of a relatively low content of the same. Thus any absorbent for absorbing sulfur oxide is preferably one capable of being regenerated and repeatedly used. However, the prior art practice has disadvantages such as the complication of the stage of regenerating the absorbent, the use of expensive absorbents accompanied by a considerable portion of the same lost at the absorption stage, and the like. Further there is another disadvantage that any of the conventional processes by which an absorbent can be regenerated is required to comprise additionally the step of preparing sulfuric acid for the reason that concentrated sulfur dioxide is recovered. It is very desirable to remove economically and efficiently sulfur oxide from waste gases to render the same harmless and simultaneously to regenerate absorbents for absorbing sulfur oxide at low costs and with high yields.

Accordingly, it is the chief object of the invention to provide a novel and improved process of treating a waste gas containing sulfur oxide with an absorbent, manganese oxide to absorb sulfur oxide by the absorbent to render the waste gas harmless and regenerating the absorbent at low costs and with a high yield.

It is another object of the invention to provide a novel and improved process as described in the preceding paragraph and producing commercially valuable sulfuric acid at the stage of regenerating the absorbent.

It is a further object of the invention to provide a novel and improved process as described in the chief object and converting hydrogen chloride into chlorine from a point of view that chlorine is increasingly in great demand in the field of modern chemical industry while hydrogen chloride is being produced in increasingly large amounts as a byproduct upon chlorinating reaction carried out in the field of petrochemical industry.

According to the principle of the invention water is added to manganese oxide to form an aqueous suspension of the latter having a concentration sufficient to maintain the fluidity of the suspension. This aqueous suspension is caused to contact such gas as a waste gas containing sulfur oxide to absorb and remove sulfur oxide from the gas. Thus the waste gas frees from sulfur oxide and can be exhausted to the surrounding atmosphere as a harmless gas. Manganese sulfate produced in the absorption step is reacted with hydrogen chloride or a gas containing the same in liquid phase at a reaction temperature not exceeding 50° C. and preferably of the order of 30° C. to produce sulfuric acid while depositing manganous chloride in a crystalline form. Then manganous chloride thus deposited is oxidized and decomposed or oxidation decomposed in the presence of air or of air and manganese oxide at a temperature of from 500° C. to 900° C. to be converted into manganese oxide and also to produce chlorine. This manganese oxide may be advantageously used to form the aqueous suspension as above described.

Sulfuric acid converted from manganese sulfate may be advantageously reacted with sodium chloride to produce hydrogen chloride and sodium sulfate. This hydrogen chloride is adapted to participate in the conversion reaction with the recovery of sodium sulfate.

Preferably, manganous chloride in the crystalline form may be preheated above 200° C. in either the absence or the presence of manganese oxide to be derived of water of crystallization and then oxidation decomposed at a temperature of from 500° to 900° C. to produce chlorine and manganese oxide.

Advantageously, the solution of sulfuric acid produced upon converting manganese sulfate into manganous chloride may be, in countercurrent relationship, with a hot, hydrogen chloride containing gas to strip hydrogen chloride dissolved in the solution of sulfuric acid from the same.

An oxygen containing gas may be conveniently used to cool the hot, produced manganese oxide and to dehydrate the water of crystallization for manganous chloride. Further the gas may be used to oxidation decompose manganous chloride.

In order to extract chlorine produced, a mixture of the same and a combustion gas may be refrigerated to produce liquid chlorine.

The invention will become more readily apparent from the following detailed description taken in conjunction with the accompanying drawing wherein a single figure illustrates an apparatus suitable for use in practicing the invention with the flows of liquid and solid materials indicated by solid lines and with the flows of gaseous materials indicated by dotted lines.

The process according to the invention comprises broadly the steps of absorbing sulfur oxide contained in a gas such as a waste gas to be treated, by an aqueous suspension of manganese oxide to produce manganese sulfate, depositing and separating manganese sulfate from the resulting absorbent solution, reacting the separated manganese sulfate with hydrogen chloride to convert the sulfate into sulfuric acid and manganous chloride, separating sulfuric acid from the deposited manganous chloride and thereafter oxidizing manganous chloride in the presence of air or air and manganese oxide to produce chlorine, and simultaneously regenerate manganese oxide, and refrigerating the mixture of air and chlorine to extract liquid chlorine.

The step of absorbing sulfur oxide or the first step is to scrub a gas such as a waste gas containing sulfur oxide with an aqueous suspension of manganese oxide to absorb sulfur oxide such as sulfur dioxide ($SO_2$) and sulfur trioxide ($SO_3$) by the latter.

To this end, any suitable manganese oxide such as manganese dioxide ($MnO_2$), manganese sesquioxide ($Mn_2O_3$), trimanganese tetroxide ($Mn_3O_4$) or the like or any mixture thereof is suspended in water. A concentration of manganese oxide suspended in the resulting liquid absorbent scarcely affects the absorption factor of the absorbent for sulfur oxide but it may be preferably about 30% or less in view of the fluidity of the liquid.

Manganese oxide absorbs sulfur oxide to produce manganese sulfate and simultaneously to render the treated gas harmless. Dependent upon compositions of a gas to be treated and a liquid absorbent, a reaction will proceed in accordance with some of the following chemical equations:

$$2MnO_2 + 3SO_2 \rightarrow MnSO_4 + MnS_2O_6$$
$$Mn_2O_3 + 2SO_2 \rightarrow MnSO_4 + MnSO_3$$
$$Mn_3O_4 + 3SO_2 \rightarrow MnSO_4 + 2MnSO_3$$
$$MnO_2 + SO_3 \rightarrow MnSO_4 + \tfrac{1}{2}O_2$$
$$Mn_2O_3 + 3SO_3 \rightarrow Mn_2(SO_4)_3$$
$$Mn_3O_4 + 4SO_3 \rightarrow MnSO_4 + Mn_2(SO_4)_3$$
$$MnSO_3 + \tfrac{1}{2}O_2 \rightarrow MnSO_4$$
$$Mn_3O_4 + 2SO_3 \rightarrow 2MnSO_4 + MnO_2$$
$$Mn_2O_3 + SO_3 \rightarrow MnSO_4 + MnO_2$$
$$Mn_2(SO_4)_3 \rightarrow 2MnSO_4 + SO_2 + O_2$$

The aqueous suspension of manganese oxide or liquid absorbent may advantageously have its operating temperature ranging from approximately room temperature to 100° C. For the satisfactory results, it has been found, however, that the temperature is preferably 75° C. or less. If the temperature of the liquid absorbent will be higher than the value as above specified, its absorption factor is greatly reduced. Accordingly, if a gas to be treated will be at an elevated temperature the same is required to be preliminary cooled.

As previously pointed out, the reaction products depend upon the compositions of the gas to be treated and the liquid absorbent and the concentrations of sulfur oxide and manganese oxide involved. Because manganese ions is high in activity of catalytic oxidation sulfur dioxide ($SO_2$) will be oxidized with oxygen contained in the gas to produce some amount of sulfuric acid. The catalytic action of manganese ions is desirable for the reason of accelerating absortion reaction. However, in order to prevent any absorber device used from being corroded by sulfuric acid thus produced, any suitable manganese oxide of lower order such as trimanganese tetroxide ($Mn_3O_4$), manganese sesquioxide ($Mn_2O_3$) or the like or a mixture thereof may be preferably increased in an amount for the purpose of converting the produced sulfuric acid into a sulfate in accordance with either or both of the following two equations:

$$2H_2SO_4 + Mn_3O_4 \rightarrow 2MnSO_4 + MnO_2 + 2H_2O$$

and $$H_2SO_4 + Mn_2O_3 \rightarrow MnSO_4 + MnO_2 + H_2O$$

In this case it is noted that manganese dioxide thus produced may be separated from the resulting solution and then mixed with manganous chloride in the fifth step as will be described hereinafter for the purpose of aiding in producing chlorine. For this reason the catalytic oxidation effected in the first step of the present process will be rather favorable in contrast to the conventional process which comprises the step of regenerating an absorbent and in which any oxidation effected in the absorption step is unfavorable.

As an example, a gas comprising, by volume, 0.2% $SO_2$, 3% $O_2$, 12.5% $CO_2$, 8.5% $H_2O$ and the balance being $N_2$ and substantially corresponding in composition to a waste gas discharged from a power station of oil burning type was passed through an absorber device of impinging type where the same was scrubbed with an aqueous suspension of manganese sesquioxide. The tests were conducted at 50°, 70° and 90° C. respectively with the gas brought into contact with the aqueous suspension for 1.21 seconds. The results obtained are listed in the following table.

Table

| Temperature in ° C | 50 | | | | 70 | 90 |
|---|---|---|---|---|---|---|
| Concentration of aqueous suspension in percent | 10 | 20 | 30 | 40 | 30 | 30 |
| Recovery of $SO_2$ in percent | 61 | 61 | 61 | 63 | 68 | 36 |

A continuous test was conducted for 90 hours with an absorber tower 60 millimeters in diameter and 2,000 millimeters in height and including wooden grids filled up therein. A tested gas comprised, by volume, 0.17% $SO_2$, 11.7% $CO_2$, 2.8% $O_2$, 14.2% $H_2O$ and the balance $N_2$ and a liquid absorbent having a concentration of 8% by weight of manganese oxide was maintained within a range of from 45° to 50° C. 65% of sulfur dioxide was absorbed by the absorbent with the result that a solution was yielded comprising by weight, 24.3% $MnSO_4$, 0.9% $MnS_2O_6$ and 0.8% $H_2SO_4$ except for solids.

The next or second step is to deposit and separate manganese sulfate from a solution yielded in the first step as above described. The solution obtained after the absorption step comprises a high amount of manganese sulfate, very low amounts of manganese dithionate and free sulfuric acid and a not-reacted portion of manganese oxide suspended in the same. The not-reacted portion of manganese oxide is first filtered out and then returned back to the absorption step for the purposes of re-using the same. By taking advantage of the solubility of manganese sulfate decreasing with an increase in temperature of a solution, the resulting filtrate is heated to deposit or crystallize and separate manganese sulfate from a solution including manganese dithionate which, in turn, may be fed back to the first or absorption step.

In the third step manganese sulfate separated as above described is reacted with hydrogen chloride to be converted into sulfuric acid and manganous chloride. This reaction may be preferably effected in a multistage reactor vessel of countercurrent type and is expressed by the following equation $$MnSO_4 \cdot 4H_2O + 2HCl \rightarrow MnCl_2 \cdot 4H_2O + H_2SO_4$$

It will be noted that the figure as to water of crystallization for manganous chloride depends upon the reaction temperature at which the chloride is produced.

More specifically, when hydrogen chloride is continued to be blown in through the solution including manganese sulfate suspended in sulfuric acid, the concentration of sulfuric acid will be increased as the reaction proceeds. However, manganese sulfate is gradually consumed. At the same time, the solubility of manganese sulfate is also decreased so that the concentration of the slurry of manganese sulfate is not reduced proportionally to the proceeding of the reaction. On the other hand, manganous chloride is progressively increased in concentration and precipitated provided that the concentration will exceed its value of saturation. However, an increase in the concentration of sulfuric acid is accompanied by a decrease in the solubility of hydrogen chloride which, in turn, is accompanied by an increase in the solubility of manganous chloride. Thus the concentration of the slurry of manganous chloride is not increased proportionally to the proceeding of the reaction. In this way, the reaction velocity is gradually decreased until the reaction will terminate at a certain value of the concentration of sulfuric acid determined by both a partial pressure of hydrogen chloride and the reaction temperature. It has been found that the reaction temperature should be 50° C. or less and preferably near room temperature with the satisfactory results. It is to be noted that, as the reaction is exothermic, effective cooling means be essentially provided to prevent an increase in reaction temperature. In addition, the higher the partial pressure of hydrogen chloride, the better, so that it is very desirable to perform the reaction under pressure.

A solution of sulfuric acid containing manganous chloride in a crystalline form is passed to a centrifuge where manganous chloride is separated from the solution of sulfuric acid which, in turn, may be supplied to a concentrator.

An experiment conducted at 30° C. and with a partial pressure of 0.2 atmosphere of hydrogen chloride yielded sulfuric acid with its concentration of 62.5%.

In the fourth step of the present process, the crystals of manganous chloride produced in the preceding step may be heated above 200° C. to be deprived of their waters of crystallization. Alternatively they may be first admixed with that portion of manganese oxide having absorbed no sulfur oxide in the first or absorption step and separated as previously described and then be heated above 200° C. to be deprived of their water of crystallization. Manganous chloride free from water of crystallization is contacted with a combustion gas containing the excess of oxygen to produce chlorine and simultaneously manganese in the form of manganese sesquioxide and trimanganese tetroxide according to the following equation:

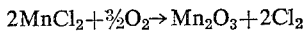

and

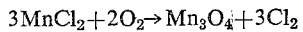

This reaction is preferably performed at a temperature of from 500° to 900° C. The higher the reaction temperature the better the rate of reaction will be. However, the reaction temperature should be chosen dependent upon the type and anti-corrosive property of a reaction vessel used. The presence of manganese dioxide yields a high rate of reaction even at a relatively low temperature of reaction.

Manganese oxide thus regenerated can be advantageously utilized as the absorbent used in the first or absorption step.

The results of experiments indicated that a conversion ratio of reaction was 60% at 750° C. in the absence of manganese dioxide whereas it was 90% at 700° C. in the presence of manganese dioxide for one hour.

As above described, a hot gaseous mixture composed of chlorine and the combustion gas has been produced in the fourth step. Therefore, chlorine is extracted from the gaseous mixture as the fifth or final step. To this end, any conventional means such as refrigeration may be used. Preferably, the hot gaseous mixture leaving a reaction vessel in which the fourth step has been performed may be passed through a heat exchanger to transfer heat to an oxygen containing gas entering the reaction vessel to thereby be cooled. The cooled gaseous mixture is then passed to any suitable refrigerator where chlorine is liquefied. Thus the liquid chlorine is separated from other gases contained in the gaseous mixture.

Referring now to the drawing, there is illustrated an apparatus suitable for use in practicing the invention. In the drawing solid lines indicate the flow of liquid and solid materials while dotted lines indicate the flows of gaseous materials. A hot gas 1, such as a hot waste gas, containing sulfur oxide which is to be removed from the gas in accordance with the invention is caused to flow into a cooling tower 2 through its lower portion which tower is supplied with a coolant 3 such as water through its top. During its upward movement through the cooling tower 2 the flow of gas is cooled to a temperature as previously specified by having the coolant contacting therewith and dusts entrained by the same are washed away into a settling tank 4. The dusts are then discharged from the tank 4 as indicated by solid line 5 and that portion of the coolant entering the tank 4 is returned back to the cooling tower 2 as indicated by solid line 3'.

The gas cooled and free from any dust is fed into an absorber tower 6 through the lower portion and contacts an aqueous suspension of manganese oxide in countercurrent relationship whereby sulfur oxide contained in the gas is absorbed by manganese oxide. The gas thus treated is, as a harmless gas, exhausted through a chimney 7 to the surrounding atmosphere.

In order to prepare the aqueous suspension of manganese oxide, manganese oxide 8 and a mother liquor 8' originating from the succeeding stages are passed to a mixer vessel 9 to be admixed with each other. Further, supplementary feed water 8" is added to the mixture until manganese oxide has its concentration sufficient to maintain the fluidity of the aqueous suspension. The aqueous suspension of manganese oxide thus prepared is supplied to the absorber tower 6 as indicated by solid line 10 and the suspension 11 leaving the same is returned back to the mixer vessel 9. Thus the aqueous suspension of manganese oxide is recirculated through the absorber tower 6 and the mixer vessel 9. A portion of the so recirculated aqueous suspension is fed from the mixer vessel 9 to a centrifuge 12 where a not-reacted portion of manganese oxide 13 is separated from a solution of manganese sulfate 14. The solution of manganese sulfate 14 is passed to the subsequent crystallization and separation stage.

At the crystallization and separation stage, the solution of manganese sulfate 14 is first heated in a heater 15 to provide a supersaturated solution. The supersaturated solution enters a crystallizing vessel 16 where the manganese sulfate is deposited in the crystalline form. A solution 17 separated from the deposit is partly returned back to the heater 15 and partly to the mixer vessel 9 as the mother liquor 8'. A solution including the crystals of manganese sulfate suspended thereinto is passed to another centrifuge 18 where the crystals 19 are separated from a liquid 20 which, in turn, is as the mother liquor 8', returned back to the mixer vessel 9 as does the liquid 17. The separated crystals of manganese sulfate 19 is passed to the succeeding conversion stage.

At the conversion stage, the crystals of manganese sulfate 19 are passed through a reservoir 21 therefor, to a multistage reaction tower 22 where the same is reacted with hydrogen chloride 23 fed from the succeeding stage to be converted into sulfuric acid and manganous chloride. It is noted that the conversion reaction is accelerated by cooling the reactants by a cold gas 24 supplied by a refrigerator as will be described hereinafter.

A solution of sulfuric acid and crystals of manganous chloride thus produced are fed into a centrifuge 25 where they are separated from each other. The resulting solution of sulfuric acid 26 is passed to a degassing tower 27 which includes a hot hydrogen chloride 28 supplied by a device for producing hydrogen chloride 29. In the degassing tower 27 the solution of sulfuric acid 26 is contacted, in countercurrent relationship with the flow of hydrogen chloride 28 to escape hydrogen chloride dissolved in the solution and thereafter is fed into the device for hydrogen chloride 29.

In the device 29, sodium chloride 30 originating from an external source (not shown) is reacted with the solution of sulfuric acid 26' to produce hydrogen chloride and sodium sulfate in accordance with any of the conventional processes. Hydrogen chloride thus produced is adapted to be fed into the degassing tower 27 to escape or strip hydrogen chloride from the solution of sulfuric acid as above described.

On the other hand, a flow of hydrogen chloride 31 leaving the degassing tower 27 enters a heat exchanger 32 where the same transfers heat to air 33 flowing into the exchanger to thereby be cooled. Hydrogen chloride thus cooled is additionally cooled by a cooler device 34 and then supplied to the reaction tower 22 where the same participates in the conversion reaction as previously described.

Manganous chloride 35 separated by the centrifuge 25 is passed to a mixer device 36 where the same is mixed with manganese oxide 13 supplied by the centrifuge 12. The resulting mixture is passed to a dehydrater device 37 to dehydrate water of crystallization included in manganous chloride at an elevated temperature.

The dehydrated mixture then enters a reaction furnace 38 which includes supplied thereto a combustion gas comprising a fuel 39 burned in hot air 39'. In the reaction furnace 38, the mixture is reacted with the combustion gas to produce chlorine and manganese oxide. A gaseous mixture 40 of the combustion gas and chlorine is passed to a heat exchanger 41 where the same transfers heat to the abovementioned air 39'. The gaseous mixture thus cooled is supplied to a refrigerator device 42 from which liquid chlorine 43 is taken out. The remainder of gaseous mixture is cooled in the refrigerator device 42 and as shown by dotted line 24 supplied to the reaction tower 22 for the purpose of cooling the same as previously described.

On the other hand, manganese oxide 44 regenerated in the reaction tower 38 is cooled by a heat exchanger 45 including a flow of air 46 supplied thereto by the heat exchanger 32 and then returned back to the mixer device 9 for the purpose of preparing the aqueous suspension of manganese oxide.

As shown by dotted line 46' the flow of air heated by the heat exchanger 45 is supplied to the dehydrater device 37 for use in dehydrating and drying the mixture of manganous chloride and manganese oxide.

From the foregoing, it will be appreciated that the invention has provided a novel process of absorbing sulfur oxide contained in a waste gas, by an absorbent or manganese oxide to render the gas harmless, and effectively regenerating manganese oxide with a high yield, as well as recovering the absorbed sulfur oxide as sulfuric acid and also recovering used hydrochloric acid as chlorine at low costs. Thus the invention is commercially advantageous in that harmful gaseous components are effectively removed and simultaneously that valuable sulfuric acid and chlorine are economically recovered.

The recovered sulfuric acid can be utilized to be reacted with sodium chloride to produce hydrogen chloride and sodium sulfate in accordance with any of the conventional processes. The use of the so produced hydrogen chloride in practicing the invention can extremely conveniently accommodate greatly increasing demand for sodium sulfate or Glauber's salt and chlorine.

While the invention has been described in conjunction with certain embodiments thereof it is to be understood that various changes and modifications may be resorted to without departing from the spirit and scope of the invention. For example, the hot, chlorine containing gas 40 leaving the reaction furnace 38 may be contacted with the dehydrated, concentrated solution of sulfuric acid in the dehydrater device 27 for the purpose of concentrating additionally the solution of sulfuric acid. Thereafter the gas is passed to the heat exchanger 41 where the heat quantity of the same is absorbed by the flow of air 39 whereby heat required for concentrating the solution of sulfuric acid can be saved. Hydrogen chloride used in practicing the invention may originate from hydrochloric acid accessorily produced upon chlorinating reaction carried out in the field of petrochemical industry instead of producing the same by the reaction of sodium chloride with sulfuric acid. This measure is very advantageous in elimination of unbalances between the demands of chlorine and hydrochloric acid. In this case, the hot, chlorine containing gas leaving the reaction furnace 38 may be conveniently utilized to concentrate the solution of sulfuric acid.

Also the flow of air 46' heated by the heat exchanger devices 32 and 45 may be advantageously passed to the dehydrating heater 37 where the same heats the mixture of manganous chloride and manganese oxide to remove water from the same, and thence to the heat exchanger device 41 where it receives heat from the hot gas leaving the reaction furnace 38. The flow of air 46' thus heated may be supplied to the reaction furnace as burning air.

What we claim is:

1. A process of treating a gas containing oxides of sulfur with manganese oxide, comprising the steps of preparing an aqueous suspension of manganese oxide having its concentration sufficient to maintain the fluidity of the aqueous suspension, contacting the gas with the aqueous suspension of manganese oxide to absorb the oxides of sulfur contained in the gas into the manganese oxide to thereby produce manganese sulfate, reacting the thus produced manganese sulfate in liquid phase with hydrogen chloride to convert the manganese sulfate to sulfuric acid and crystalline manganous chloride, and oxidation decomposing the manganous chloride with a combustion gas containing excess free oxygen to produce chlorine and manganese oxide, the last-mentioned manganese oxide being used to prepare the aqueous suspension thereof.

2. A process of treating a gas containing oxides of sulfur with manganese oxide, comprising the steps of preparing an aqueous suspension of manganese oxide having its concentration sufficient to maintain the fluidity of the aqueous suspension, contacting the gas with the aqueous suspension of manganese oxide to absorb the oxides of sulfur contained in the gas into the manganese oxide to thereby produce manganese sulfate, reacting the thus produced manganese sulfate in liquid phase with hydrogen chloride at a temperature no greater than about 50° C. to convert the manganese sulfate to sulfuric acid and crystalline manganous chloride, and oxidation decomposing, in the presence of manganese oxide, the manganous chloride with a combustion gas containing excess free oxygen to produce chlorine and manganese oxide, the last-mentioned manganese oxide being used to prepare the aqueous suspension thereof.

3. A process of treating a gas containing oxides of sulfur with manganese oxide, comprising the steps of preparing an aqueous suspension of manganese oxide having its concentration sufficient to maintain the fluidity of the aqueous suspension, contacting the gas with the aqueous suspension of manganese oxide to absorb the oxides of sulfur contained in the gas into the manganese oxide to thereby produce manganese sulfate, reacting the thus produced manganese sulfate in liquid phase with hydrogen chloride to convert the manganese sulfate to sulfuric acid and crystalline manganous cholride and oxidation decomposing the manganous chloride with a combustion gas containing excess free oxygen to produce chlorine and manganese oxide, the last-mentioned manganese oxide being used to prepare the aqueous suspension thereof, reacting the sulfuric acid obtained from the manganese sulfate conversion with sodium chloride to produce hydrogen chloride and sodium sulfate, the last-mentioned hydrogen chloride, after the sodium sulfate is recovered therefrom, being adapted to be reacted with the manganese sulfate in said conversion of the manganese sulfate to sulfuric acid and crystalline manganous chloride.

4. A process of treating a gas containing oxides of sulfur with manganese oxide, comprising the steps of preparing an aqueous suspension of manganese oxide having its concentration sufficient to maintain the fluidity of the aqueous suspension, contacting the gas with the aqueous suspension of manganese oxide to absorb the oxides of sulfur contained in the gas into the manganese oxide to thereby produce manganese sulfate, reacting the thus produced manganese sulfate in liquid phase with hydrogen chloride to convert the manganese sulfate to sulfuric acid and crystalline manganous chloride and oxidation decomposing, in the presence of manganese oxide, manganous chloride with a combustion gas containing excess free oxygen to produce chlorine and manganese oxide, the last-mentioned manganese oxide being used to prepare the aqueous suspension thereof, reacting the sulfuric acid obtained from the manganese sulfate conversion with sodium chloride to produce hydrogen chloride and sodium sulfate, the last-mentioned hydrogen chloride being adapted to be reacted with the manganese sulfate in said conversion of the manganese sulfate to sulfuric acid and crystalline manganese chloride.

5. The process of claim 1, wherein said oxidation decomposition is carried out at a temperature of from 500° to 900° C. after the crystalline manganous chloride has been heated at a temperature above 200° C. to be freed of its water of crystallization.

6. The process of claim 2, wherein said oxidation decomposition is carried out at a temperature of from 500° to 900° C. after the crystalline manganous chloride has been heated at a temperature above 200° C. to be freed of its water of crystallization.

7. The process of claim 1, further; comprising contacting, in countercurrent relationship, the solution of sulfuric acid produced upon converting manganese sulfate to manganous chloride, with a hot, hydrogen chloride containing gas to strip hydrogen chloride dissolved in the solution of sulfuric acid, transferring heat between the hot gas having performed the stripping operation and an oxygen containing gas to preheat manganous chloride to thereby heat the latter gas, and cool the former gas to condense and separate water in the gas from the same and then supplying the cooled hydrogen chloride containing gas to the step of converting manganese sulfate into manganous chloride.

8. The process of claim 1, further comprising contacting, in countercurrent relationship, hot, manganese oxide resulting from said oxidation with an oxygen containing gas to cool the manganese oxide as well as to dehydrate water of crystallization from the crystalline manganous chloride, and supplying the oxygen containing gas to oxidation decompose manganous chloride.

9. The process of claim 1, further comprising contacting a hot, chlorine containing gas with the solution of sulfuric acid, free from hydrogen chloride, to concentrate the solution, cooling the chlorine containing gas by transferring heat between the same and a cold, oxygen containing gas, and refrigerating the cooled, chlorine containing gas to produce liquid chlorine, the oxygen containing gas being heated by heat transfer supplied for the oxidation decomposition step.

10. The process of claim 2, further comprising contacting a hot, chlorine containing gas with the solution of sulfuric acid, free from hydrogen chloride, to concentrate the solution, cooling the chlorine containing gas by transferring heat between the same and a cold, oxygen containing gas, and refrigerating the cooled, chlorine containing gas to produce liquid chlorine, the oxygen containing gas being heated by heat transfer supplied for the oxidation decomposition step.

References Cited by the Examiner
UNITED STATES PATENTS

| | | | |
|---|---|---|---|
| 348,348 | 8/1886 | Rumpf | 23—219 |
| 2,531,137 | 11/1950 | Laubi et al. | 23—167 |
| 3,150,923 | 9/1964 | Bienstock et al. | 23—178 |

OTHER REFERENCES

Mellor: Inorganic and Theoretical Chemistry, Vol. 12, p. 411, QD31 M4.

Tarbutton et al.: "Recovery of Sulfur Dioxide From Flue Gases," Industrial and Engineering Chemistry, Vol. 49, No. 3, pp. 394–5, TP 1 A58.

BENJAMIN HENKIN, *Primary Eaminer.*

MAURICE A. BRINDISI, *Examiner.*